(12) United States Patent
Joshi et al.

(10) Patent No.: US 8,300,618 B2
(45) Date of Patent: Oct. 30, 2012

(54) USER PRIORITY BASED PREEMPTION TECHNIQUES IN A TIME DIVISION MULTIPLE ACCESS MULTI-HOP AD HOC NETWORK

(75) Inventors: Avinash Joshi, Lake Mary, FL (US); Manish Shukla, Altamonte Springs, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1501 days.

(21) Appl. No.: 11/781,015

(22) Filed: Jul. 20, 2007

(65) Prior Publication Data
US 2009/0022136 A1  Jan. 22, 2009

(51) Int. Cl.
*H04B 7/212* (2006.01)

(52) U.S. Cl. .................. 370/348; 370/345; 370/395.42; 370/332; 370/229; 370/231

(58) Field of Classification Search .................. 370/348, 370/345, 395.42, 332, 229, 231
See application file for complete search history.

(56) References Cited

U.S. PATENT DOCUMENTS

| | | | |
|---|---|---|---|
| 5,734,867 A | 3/1998 | Clanton et al. | |
| 6,157,669 A | 12/2000 | Kotzin | |
| 7,164,656 B2 | 1/2007 | Foster et al. | |
| 7,349,362 B2 | 3/2008 | Belcea | |
| 2002/0181395 A1* | 12/2002 | Foster et al. | 370/229 |
| 2003/0179756 A1* | 9/2003 | Cain | 370/395.42 |
| 2004/0109428 A1 | 6/2004 | Krishnamurthy | |
| 2004/0143842 A1 | 7/2004 | Joshi | |
| 2006/0056382 A1 | 3/2006 | Yamada et al. | |

OTHER PUBLICATIONS

PCT International Search Report Application No. PCT/US2008/069575 Dated Jan. 23, 2009—12 Pages.
H. Arora et al.—Toward the Use of Local Monitoring and Network-Wide Correction to Achieve QoS Guarantees in Mobile Ad Hoc Network. Dated Oct. 4-7, 2004—11 Pages.
Sheu, T.L. et al., A Preemptive Channel Allocation Scheme for Multimedia Traffic in Mobile Wireless Networks, Information Sciences, vol. 176, Issue 3, Feb. 6, 2006, pp. 217-236.
PCT/US2008/069575, PCT Preliminary Report on Patentability, mailed Feb. 4, 2010, 8 pages.
"USAP: A Unifying Dynamic Distributed Multichannel TDMA Slot Assignment Protocol" by C. David Young (Rockwell Int'l Communications) Aug. 1996—pp. 235-239.
"A Paradigm for Quality-Of-Service in Wireless Ad Hoc Networks Using Synchronous Signaling and Node States" by John A. Stine—vol. 22, No. 7, Sep. 2004 pp. 1301-1321.
"Priority Scheduling in Wireless Ad Hoc Networks" by Yang et al—Published-in-part 2002—ACM Int'l Symposium on Mobile Ad-Hoc Networking Computing—Published On-line: Dec. 2005, pp. 271-286.

* cited by examiner

*Primary Examiner* — Charles Appiah
*Assistant Examiner* — Alexander Yi
(74) *Attorney, Agent, or Firm* — Randi L. Karpinia

(57) ABSTRACT

When a source node (SN) seeks to transmit a first communication stream (FCS) to a destination node (DN), a method is provided for allowing the SN to preempt a lower priority communication stream (LPCS). User priorities are supported during slot scheduling based on stream-identifiers (IDs) and stream priority values exchanged by each of the nodes. A scout request message (SRM), which includes a stream ID and a user priority value of the SN, is transmitted to a next-hop node along a route towards the DN. A node along the route determines if free time slots are available along the route to meet QoS requirements of the FCS, and if not, the node determines whether there is a LPCS in the neighborhood, and if so, the node frees the particular time slots currently being used by the LPCS, and allocates the particular time slots for the FCS.

16 Claims, 14 Drawing Sheets

400

LOCAL COMMUNICATION MAP

| TIME SLOT # | SELF TX | SELF RX | NBR TX | NBR RX | NBRTX LIST | NBRRX LIST |
|---|---|---|---|---|---|---|
| | | | | | | |
| | | | | | | |

FIELD DESCRIPTION OF LCM

| FIELD | DESCRIPTION |
|---|---|
| TIME SLOT # | THE TIME SLOT NUMBER RELATIVE TO THE START OF FRAME. THE NUMBER OF ENTRIES IN LCM WILL BE EQUAL TO THE NUMBER OF TIME SLOTS IN A FRAME |
| SELF TX | ONE BIT VALUE SIGNIFYING WHETHER THE NODE ITSELF IS TRANSMITTING ON THIS TIME SLOT OR NOT. 1 - TRANSMITTING, 0 - NOT TRANSMITTING |
| SELF RX | ONE BIT VALUE SIGNIFYING WHETHER THE NODE ITSELF IS RECEIVING ON THIS TIME FRAME OR NOT. 1 - RECEIVING, 0 - NOT RECEIVING |
| NBR TX | ONE BIT VALUE SIGNIFYING WHETHER ONE OF THE NEIGHBORS OF THE NODE IS TRANSMITTING OR NOT. 1 - TRANSMITTING, 0 - NOT TRANSMITTING |
| NBR RX | ONE BIT VALUE SIGNIFYING WHETHER ONE OF THE NEIGHBORS OF THE NODE IS RECEIVING ON THIS TIME SLOT OR NOT. 1 - RECEIVING, 0 - NOT RECEIVING |
| NBRTX LIST | THIS FIELD POINTS TO A LINK LIST OF ALL THE NEIGHBORS THAT ARE CURRENTLY TRANSMITTING ON THIS SLOT |
| NBRRX LIST | THIS FIELD POINTS TO A LINK LIST OF ALL THE NEIGHBORS THAT ARE CURRENTLY RECEIVING ON THIS SLOT |

*FIG. 5*

FIG. 6 — POSSIBLE LCM SCENARIOS (600)

| TIME SLOT # | SELF TX | SELF RX | NBR TX | NBR RX | NBRTX LIST | NBRRX LIST | CASE # |
|---|---|---|---|---|---|---|---|
|  | 0 | 0 | 0 | 0 |  |  | 1 |
|  | 0 | 0 | 0 | 1 |  | → | 2 |
|  | 0 | 0 | 1 | 0 | → |  | 3 |
|  | 0 | 0 | 1 | 1 | → | → | 4 |
|  | 0 | 1 | 1 | 0 | → |  | 5 |
|  | 0 | 1 | 1 | 1 | → | → | 6 |
|  | 1 | 0 | 0 | 1 |  | → | 7 |
|  | 1 | 0 | 1 | 1 | → | → | 8 |

FIG. 7 (700)

| STRM # | SRC ADDR | DEST ADDR | DATA SLOT ALLOCATED | EXP TIME | PREV HOP | NEXT HOP | DATA BUFFER | SELFRX SLOT | DATA RATE | DELAY |

FIG. 8 — MAPPING OF LCM TO TPSM AND RPSM (800)

| TIME SLOT # | SELF TX | SELF RX | NBR TX | NBR RX | CASE # | TPSM | RPSM |
|---|---|---|---|---|---|---|---|
|  | 0 | 0 | 0 | 0 | 1 | 1 | 1 |
|  | 0 | 0 | 0 | 1→ | 2 | 0 | 1 |
|  | 0 | 0 | 1→ | 0 | 3 | 1 | 0 |
|  | 0 | 0 | 1→ | 1→ | 4 | 0 | 0 |
|  | 0 | 1 | 1→ | 0 | 5 | 0 | 0 |
|  | 0 | 1 | 1→ | 1→ | 6 | 0 | 0 |
|  | 1 | 0 | 0 | 1→ | 7 | 0 | 0 |
|  | 1 | 0 | 1→ | 1→ | 8 | 0 | 0 |

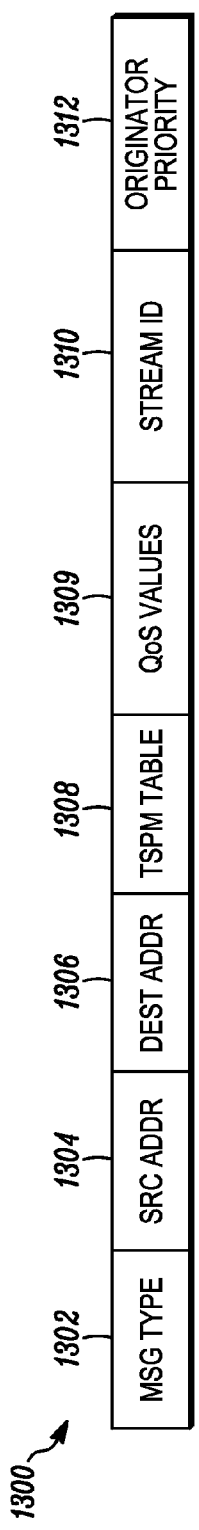
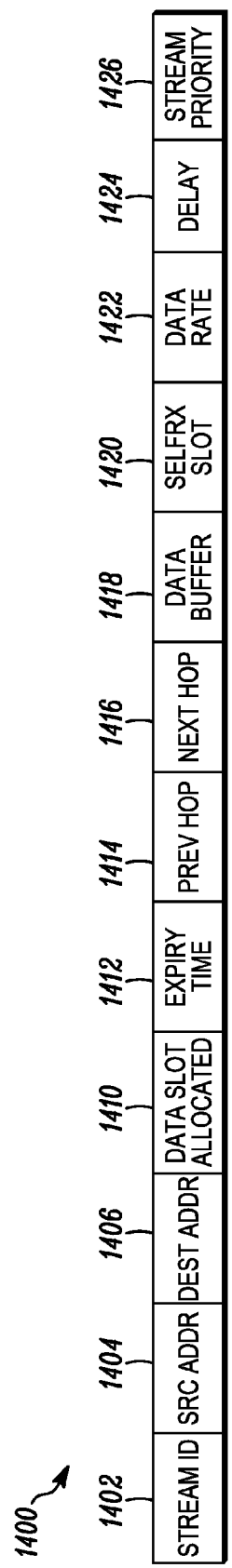
FIG. 13
FIG. 14

USER PRIORITY BASED PREEMPTION TECHNIQUES IN A TIME DIVISION MULTIPLE ACCESS MULTI-HOP AD HOC NETWORK

FIELD OF THE INVENTION

The present invention relates generally to wireless communications and more particularly to preemption techniques in Time Division Multiple Access (TDMA)-based multi-hop ad hoc networks.

BACKGROUND

Types of wireless networks include infrastructure-based wireless networks and ad hoc wireless networks.

Ad hoc networks are self-forming networks which can operate in the absence of any fixed infrastructure, and in some cases the ad hoc network is formed entirely of mobile nodes. An ad hoc network typically includes a number of geographically-distributed, potentially mobile units, sometimes referred to as "nodes," which are wirelessly connected to each other by one or more links (e.g., radio frequency communication channels). The nodes can communicate with each other over a wireless media without the support of an infrastructure-based or wired network. Links or connections between these nodes can change dynamically in an arbitrary manner as existing nodes move within the ad hoc network, as new nodes join or enter the ad hoc network, or as existing nodes leave or exit the ad hoc network. Because the topology of an ad hoc network can change significantly techniques are needed which can allow the ad hoc network to dynamically adjust to these changes. Due to the lack of a central controller, many network-controlling functions can be distributed among the nodes such that the nodes can self-organize and reconfigure in response to topology changes.

One characteristic of ad hoc network nodes is that each node can directly communicate over a short range with nodes which are a single "hop" away. Such nodes are sometimes referred to as "neighbor nodes." When a node transmits packets to a destination node and the nodes are separated by more than one hop (e.g., the distance between two nodes exceeds the radio transmission range of the nodes, or a physical barrier is present between the nodes), the packets can be relayed via intermediate nodes ("multi-hopping") until the packets reach the destination node. In such situations, each intermediate node routes the packets (e.g., data and control information) to the next node along the route, until the packets reach their final destination. For relaying packets to the next node, each node maintains routing information collected through conversation with its neighboring nodes. The routing information can also be periodically broadcast in the network to reflect the current network topology. Alternatively, to reduce the amount of information transmitted for maintaining accurate routing information, the network nodes may exchange routing information only when it is needed. One approach for routing information, known as Mesh Scalable Routing (MSR), is described in United States Patent Application Publication Number 20040143842 entitled "System And Method For Achieving Continuous Connectivity To An Access Point Or Gateway In A Wireless Network Following An On-Demand Routing Protocol, And To Perform Smooth Handoff Of Mobile Terminals Between Fixed Terminals In The Network," filed Jan. 13, 2004, which is incorporated by reference herein in its entirety.

Time Division Multiple Access (TDMA) is a shared medium access technology that is commonly used in digital cellular networks, satellite networks, local area networks, and other shared medium networks. In TDMA-based systems, a radio frequency is divided into time slots, and a unit may transmit in one or several time slots which are assigned to that unit. The users transmit in rapid succession, one after the other, each using their assigned timeslot(s). This allows multiple users to share the same transmission medium (e.g., radio frequency) while using only the part of its bandwidth which they require.

Most TDMA systems use centralized time slot allocation. For example, in a cellular system, a base station is the central authority which controls time slot allocation. In a local area network (LAN), an access point is the central node which controls time slot allocation. TDMA medium access control (MAC) protocols allow several users to share the same frequency by dividing it into different timeslots. TDMA MAC protocols require time synchronization and slot reservation for collision free transmission. TDMA MAC protocols are generally regarded as being efficient for periodic, delay sensitive traffic (e.g., voice traffic and video traffic), since they provide contention free transmission.

Centralized allocation of timeslots requires exchanging a large amount of network management information, which consumes valuable communication bandwidth. Centralized timeslot allocation techniques are typically applied in networks where the length of the communication path is relatively small (e.g., only one hop). Applying centralized timeslot allocation techniques in multi-hopping networks can be problematic because the of the significant amount of time required for propagating information from nodes at the periphery of the network to a central node, and for propagating information from the central node back to the nodes at the periphery of the network. Centralized timeslot allocation techniques can be inefficient for reaching all network nodes due to mobility of nodes and the relatively long time needed for propagating the information to each node in the network. For this reason, in mobile multi-hopping networks, where the topology of nodes changes frequently, the utilization of centralized timeslot allocation techniques can be prohibitive.

In many multi-hop ad hoc networks, including those which use a Time Division Multiple Access (TDMA) Media Access Control (MAC) protocols, multiple routes can be present between a source node and a destination node for communication of a particular data stream. In some communication scenarios some or even all of the routes may not support Quality-of-Service (QoS) requirements of the particular data stream. This can occur, for example, when certain routes do not have a sufficient number of time slots to sustain the particular data stream.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 4 is a table for the storage of information in a local communication map (LCM) according to one implementation;

FIG. 5 is a table showing field descriptions used in the LCM of FIG. 4 according to one implementation;

FIG. 6 is a table showing possible combinations of entries in LCM and how information in the local LCM is used to generate other useful maps according to one implementation;

FIG. 7 is a table showing an entry in a slot allocation table (SAT) according to one implementation;

FIG. 8 is a table showing how the local communication map (LCM) of FIG. 4 can be mapped to a Transmission Possible Slot Map (TPSM) and a Reception Possible Slot Map (RPSM) according to one implementation;

FIG. 13 is a data structure diagram illustrating a scout request message (SRM) according to at least some embodiments of the invention;

FIG. 14 is a data structure diagram illustrating a Scout Allocation Table (SAT) according to at least some embodiments of the invention;

Figure 1:
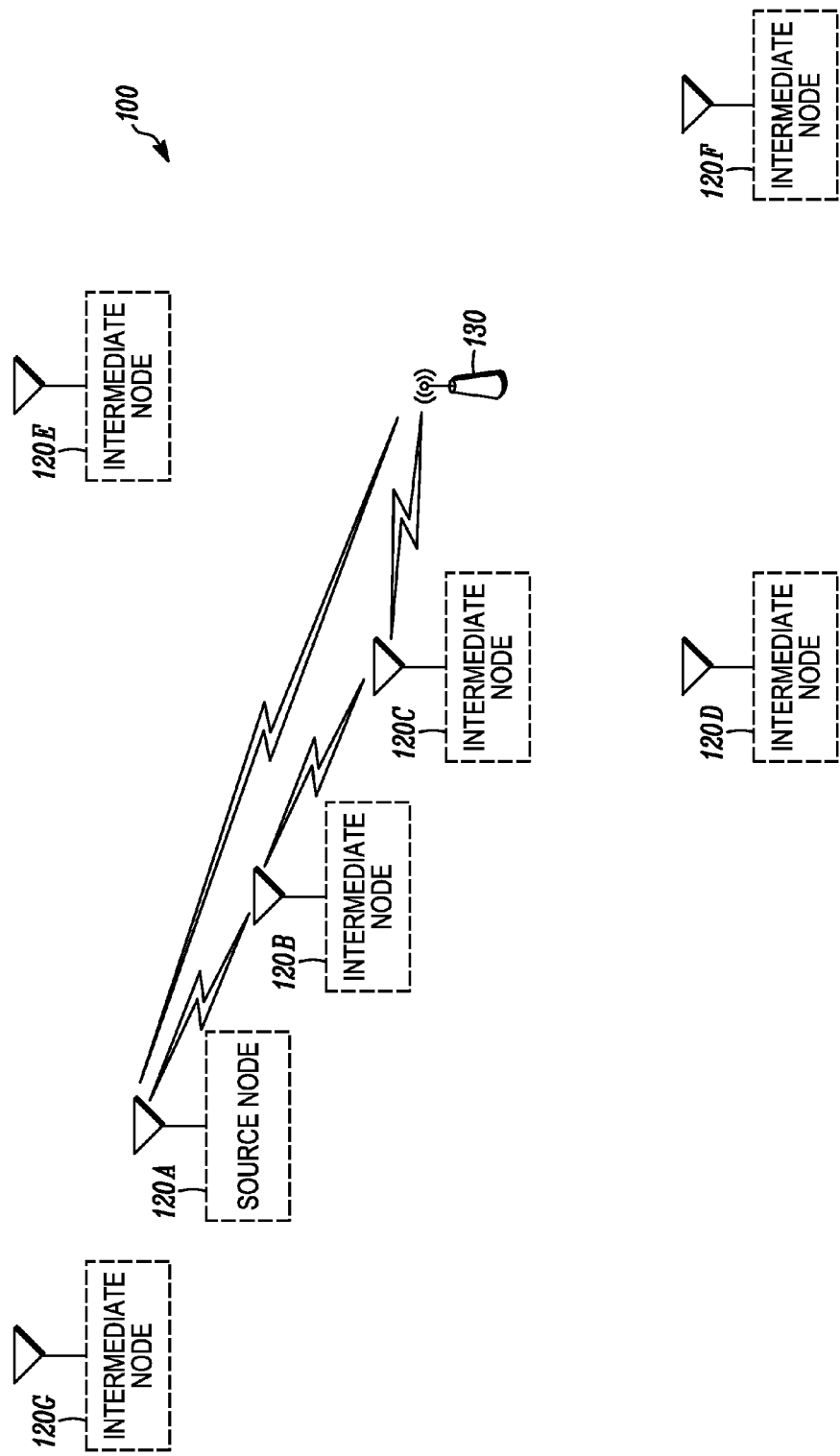
FIG. 1 is a block diagram of an ad hoc communication network.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to for preemption based on user priorities. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions for preemption based on user priorities, as described herein. The non-processor circuits may include, but are not limited to, a radio receiver, a radio transmitter, signal drivers, clock circuits, power source circuits, and user input devices. As such, these functions may be interpreted as steps of a method for preemption based on user priorities. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Any embodiment described herein is not necessarily to be construed as preferred or advantageous over other embodiments. All of the embodiments described in this Detailed Description are illustrative provided to enable persons skilled in the art to make or use the invention and not to limit the scope of the invention which is defined by the claims.

Ad Hoc Multi-hopping Network

FIG. 1 is a block diagram of an ad hoc communication network 100 comprises a number of existing nodes 120A-G.

The nodes 120A-120G typically support simultaneous operation in both infrastructureless mode and infrastructured mode and can move seamlessly between infrastructure-based networks (those including for example an Access Point AP 130) and client-based peer-to-peer networks which are free of any infrastructure.

The ad hoc multi-hopping communication network 100 can be created between a plurality of nodes 120A-120G each having wireless repeater and routing capability, and optionally a wired Access Point (AP) 130. Clients can move seamlessly between infrastructure-based networks and client-based peer-to-peer networks. It will be appreciated by those of ordinary skill in the art that while the ad hoc network 100 in FIG. 1 is shown as operating in an infrastructured mode (e.g., including APs and/or cellular base stations), the ad hoc network 100 of FIG. 1 does not require any network infrastructure to be present. Rather, the nodes 120A-120G typically support simultaneous operation in both infrastructure-less mode and infrastructured mode.

In the ad hoc multi-hopping network 100, communications to and/or from nodes 120A-120G can "hop" through each other to reach other nodes 120A-120G in the network. The nodes 120A-120G can generally be wireless devices capable of receiving packetized audio, video and/or data information. Some of the components in an node, such as an processor, transmitter, receiver and antenna, are described below in FIG. 2. The nodes 120A-120G can exchange information as data packets transmitted over carrier frequencies, each of which includes one or more wireless communication channels.

In infrastructure mode, the access point AP 130 is typically coupled to a wired network (not shown) and can provide one or more sources of audio, video and/or data information. The access point AP 130 may be, for example, a cellular base station or other wireless access point.

Although not shown in FIG. 1, it will be appreciated by those of ordinary skill in the art that the nodes 120A-120G, can also communicate information packets with a cellular-based network (not shown) over wireless communication medium, each of which includes one or more wireless communication channels depending on the multiple access scheme utilized in the cellular-based network.

Each of the nodes 120A-G in the network is synchronized to a common clock. Synchronizing the clocks which control the transmission time and the unique assignment of timeslots can prevent the transmission of signals from more than one node at any particular time in any particular neighborhood. The nodes can be synchronized to this clock via a distributed synchronization technique, such as that described, for example, in U.S. Pat. No. 7,349,362, issued Mar. 25, 2008 entitled "Method And System For Implementing Time Division Multiple Access Method To Ad Hoc Multihopping Wireless Networks," and assigned to the assignee of the present invention, which is incorporated herein by reference in its entirety.

Node

Figure 2:
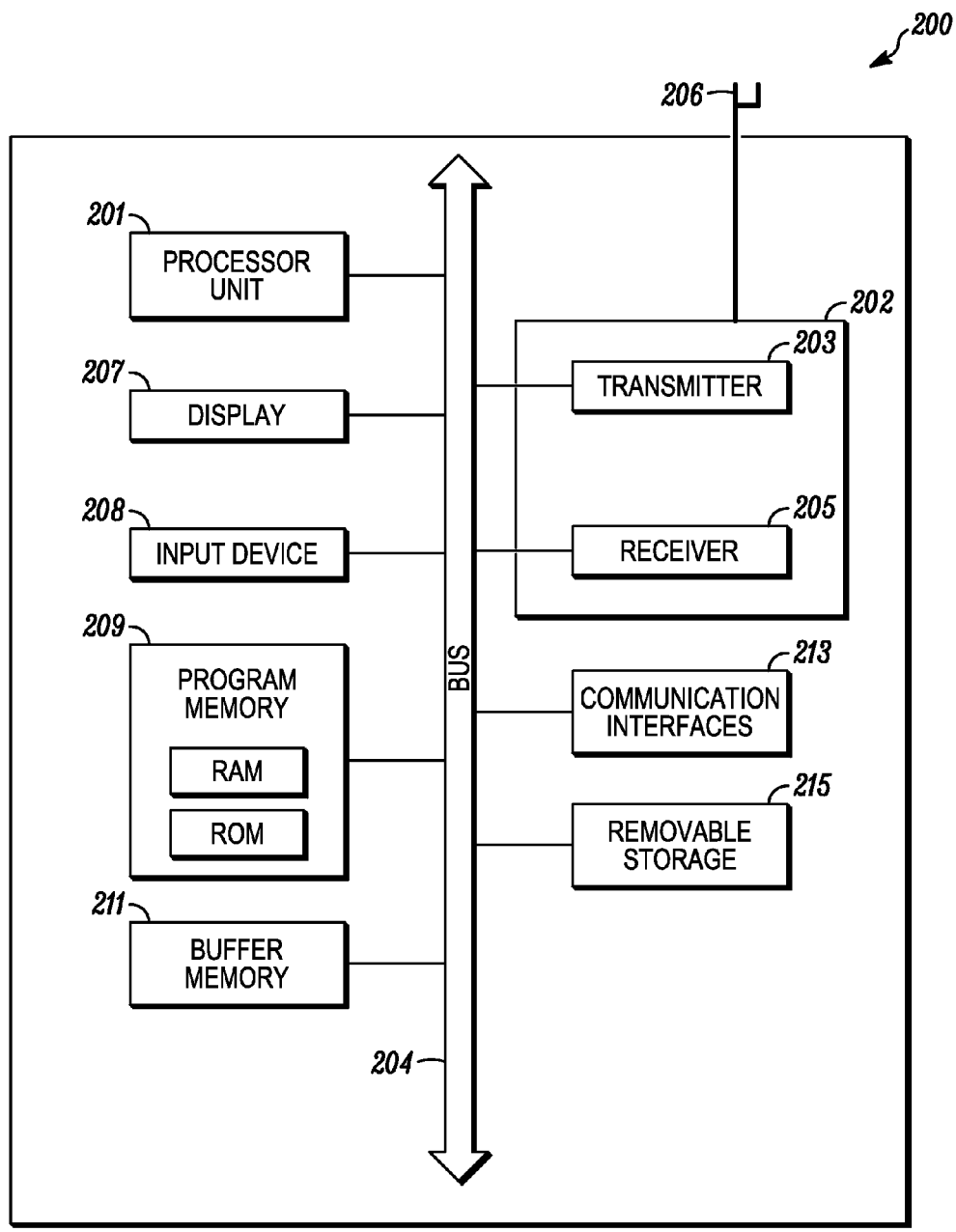
FIG. 2 is a block diagram of a node for use in the operation of some embodiments of the invention.

FIG. 2 is a block diagram of a node 200. The node 200 comprises a processor 201, a transceiver 202 including a transmitter circuitry 203 and a receiver circuitry 205, an antenna 206, a display 207, an input device 208, a program memory 209 for storing operating instructions that are executed by the processor 201, a buffer memory 211, one or more communication interfaces 213, and a removable storage unit 215. Although not shown, the node 200 also can include an antenna switch, duplexer, circulator, or other highly isolative means (not shown) for intermittently providing information packets from the transmitter circuitry 203 to the antenna 206 and from the antenna 206 to the receiver circuitry 205. The node 200 can be an integrated unit containing at least all the elements depicted in FIG. 2, as well as any other elements necessary for the node 200 to perform its particular functions. Alternatively, the node 200 may comprise a collection of appropriately interconnected units or devices, wherein such units or devices perform functions that are equivalent to the functions performed by the elements of the node 200. For example, the node 200 may comprise a laptop computer and a wireless LAN (local area network) card.

The processor 201 can include one or more microprocessors, microcontrollers, DSPs (digital signal processors), state machines, logic circuitry, or any other device or devices that process information based on operational or programming instructions. Such operational or programming instructions can be, for example, stored in the program memory 209. The program memory 209 may be an IC (integrated circuit) memory chip containing any form of RAM (random-access memory) or ROM (read-only memory), a floppy disk, a CD-ROM (compact disk read-only memory), a hard disk drive, a DVD (digital video disc), a flash memory card or any other medium for storing digital information. One of ordinary skill in the art will recognize that when the processor 201 has one or more of its functions performed by a state machine or logic circuitry, the memory 209 containing the corresponding operational instructions may be embedded within the state machine or logic circuitry. The operations performed by the processor 201 and the rest of the node 200 are described in detail below.

The transmitter circuitry 203 and the receiver circuitry 205 enable the node 200 to communicate information packets to and acquire information packets from the other nodes. In this regard, the transmitter circuitry 203 and the receiver circuitry 205 include conventional circuitry to enable digital or analog transmissions over a wireless communication channel. The transmitter circuitry 203 and the receiver circuitry 205 are designed to operate over both a cellular air interface (e.g., Global System for Mobile communication (GSM), Code Division Multiple Access (CDMA), Wide-band CDMA (WCDMA), Universal Mobile Telecommunications System (UMTS), and the like) and an ad hoc networking air interface (e.g., BLUETOOTH, 802.11 WLAN (wireless local area network), 802.16 Worldwide Interoperability for Microwave Access (WiMax), and the like)

The implementations of the transmitter circuitry 203 and the receiver circuitry 205 depend on the implementation of the node 200. For example, the transmitter circuitry 203 and the receiver circuitry 205 can be implemented as an appropriate wireless modem, or as conventional transmitting and receiving components of two-way wireless communication devices. In the event that the transmitter circuitry 203 and the receiver circuitry 205 are implemented as a wireless modem, the modem can be internal to the node 200 or insertable into the node 200 (e.g., embodied in a wireless radio frequency (RF) modem implemented on a Personal Computer Memory Card International Association (PCMCIA) card). For a wireless communication device, the transmitter circuitry 203 and the receiver circuitry 205 can be implemented as part of the wireless device hardware and software architecture in accordance with known techniques. Most, if not all, of the functions of the transmitter circuitry 203 and/or the receiver circuitry 205 may be implemented in a processor, such as the processor 201. However, the processor 201, the transmitter circuitry 203, and the receiver circuitry 205 have been artificially partitioned herein to facilitate a better understanding.

The receiver circuitry 205 is capable of receiving radio frequency (RF) signals from at least one bandwidth and optionally multiple bandwidths, if the communications with the proximate device are in a frequency band other than that of the network communications. The receiver circuitry 205 may optionally comprise a first receiver and a second receiver, or one receiver capable of receiving in two or more bandwidths. The transceiver 202 includes at least one set of transmitter circuitry 203. The at least one transmitter 203 may be capable of transmitting to multiple devices on multiple frequency bands. As with the receiver 205, dual transmitters 203 may optionally be employed where one transmitter is for the transmission to a proximate node or direct link establishment to WLANs and the other transmitter is for transmission to a cellular base station, for example.

The antenna 206 comprises any known or developed structure for radiating and receiving electromagnetic energy in the frequency range containing the wireless carrier frequencies.

The buffer memory 211 may be any form of volatile memory, such as RAM, and is used for temporarily storing received information packets in accordance with the present invention.

When the node 200 is constructed to receive video information from a video source, the node 200 further can include a video decoder capable of decoding the current Moving Picture Experts Group (MPEG) standard or some other video decoding standard. When the node 200 is further capable of transmitting video information, the node 200 further can include a video encoder capable of encoding the video data into at least one of the foregoing video standards. Such video encoder and decoder can be, for example, implemented as part of the processor 201.

Time Slot Management Techniques

Figure 3:
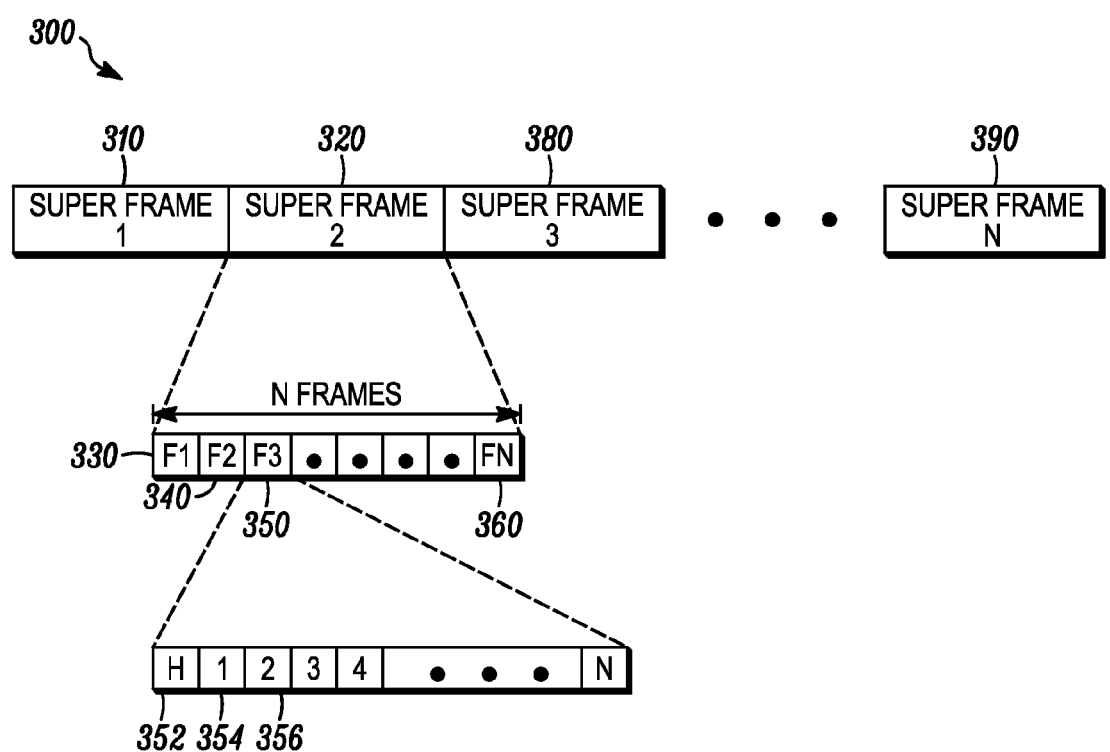
FIG. 3 is a data structure diagram showing a super frame data structure according to one implementation.

FIG. 3 is a data structure diagram showing a super frame data structure 300 according to at least some embodiments of the invention. After initializing, all the nodes adhere to the framing structure shown in FIG. 3.

The super frame data structure 300 comprises a plurality of super frames (Super Frame 1 . . . Super Frame n) 310, 320, 380 . . . 390. Each super frame comprises a number of frames. For example, super frame 320 comprises frames (F1 . . . FN) 330-360.

Each frame (F1 . . . FN) 330-360 comprises actual time slots including at least one a Hello time slot (H) at the zero$^{th}$ time slot 352 followed by data time slots. In some implementations, for example to accommodate large number of neighbors, more than one Hello time slot (H) can be provided in the TDMA portion 351 of the frame 350 (e.g., may have multiple Hello time slots in the beginning of the TDMA portion 351 of the frame 350). Nodes transmit one hello message 352 per super-frame and receive hello messages transmitted by other nodes. In one exemplary implementation, each time slot in the frame 350 is long enough in duration to accommodate/carry at least one voice over internet protocol (VoIP) packet.

In accordance with embodiments described herein, time slots can be scheduled in a distributed manner without the help of a central scheduler. Scheduling techniques use routing information provided by a routing protocol to identify route(s) which can support the QoS requirements of the data stream. The scheduling process works with any routing protocol, and is particularly useful with routing protocols which can provide multiple routes to a destination node. Scheduling of time slots involves allocation of slots, maintenance of allocated slots, and de-allocation of slots. Slots are allocated for each data stream. In one implementation, data streams are uniquely identified by stream number which is a tuple <MAC address of source, MAC address of destination, Stream identification (ID)>. These can be real MAC addresses or short hand addresses.

Once the allocated slots are not being used to transfer data the allocated slots can be freed so that other nodes can reuse them effectively. The allocation of slots is done such that the QoS requirement of the data stream can be maintained over multiple hops. Slot allocation is performed to maximize spatial reuse; this involves timely notification of allocation to the neighborhood, such that distant nodes can reuse the time slots. After initial time slot allocation, the allocated time slots may start experiencing interference due, for example, to mobility of nodes. Appropriate mechanisms are needed to detect time slot interference and resolve the same. After a change or changes in route to the destination node, techniques for reallocating time slots are also needed. Allocated time slots should be freed ("de-allocation of slots") once they are not being used to transfer data so that other nodes can reuse those time slots.

Slot Information Data Structures

Local Communication Map

Nodes in the network maintain a Local Communication Map (LCM) which stores the information about each of the time slots (i.e., the status of each time slot). The LCM is updated by a node upon receiving a hello message or scouting messages as described in later sections hereinafter.

FIG. 4 is a table showing the structure of information stored in a local communication map (LCM) 400 according to one implementation. FIG. 5 is a table 500 showing field descriptions used in the LCM of FIG. 4 according to one implementation. The table 500 includes a time slot number field (Time Slot # field), a self transmit field (Self Tx field), a self receive field (Self Rx field), a neighbor transmit field (Nbr Tx field), a neighbor receive field (Nbr Rx Field), a neighbor transmit list field (NbrTx List field), and a neighbor receive list field (NbrRx List Field).

The Time Slot # field specifies the time slot number relative to the start of frame. The number of entries in LCM will be equal to the number of time slots in a frame. The Self Tx field comprises a one bit value signifying whether the node itself is transmitting on this time slot or not (e.g., 1—Transmitting, 0—Not Transmitting). The Self Rx field comprises a one bit value signifying whether the node itself is receiving on this time frame or not (e.g., 1—Receiving, 0—Not Receiving). The Nbr Tx field comprises a one bit value signifying whether one of the neighbors of the node is transmitting or not (e.g., 1—Transmitting, 0—Not Transmitting). The Nbr Rx Field comprises a one bit value signifying whether one of the neighbors of the node is receiving on this time slot or not (e.g., 1—Receiving, 0—Not Receiving). The NbrTx List field points to a link list of all the neighbors that are currently transmitting on this slot. The NbrRx List Field points to a link list of all the neighbors that are currently receiving on this slot.

FIG. 6 is a table 600 showing possible combinations of entries in LCM and how information in the local LCM is used to generate other useful maps according to one implementation. Preliminarily, it should be noted that although there are sixteen possible ways in which this table can be filled with ones and zeroes, there are only eight valid cases since some cases, such as SelfTx and SelfRx simultaneously being 1, are considered invalid. The entries in LCM table (SelfTx, SelfRx, NbrTx, and NbrRx) are populated while exchanging scouting messages. This is described in detail below.

In table 600, the symbol → points to a link list of all the neighbors who have indicated that they are transmitting on this time slot. The value 1 will be changed to 0 only if all these neighbors have indicated otherwise. The symbol → points to a link list of all the neighbors who have indicated that they are receiving on this time slot. The value 1 will be changed to 0 only if all these neighbors have indicated otherwise.

In case 1, the current node has no information about any transmission or reception in the neighborhood and the current node is neither transmitting nor receiving. In case 2, one or more of the neighbors have indicated that they are receiving on this time slot. Since none of the neighboring node has indicated about transmission, the transmitter node must be a two hop neighbor. In case 3, one or more of the neighbors have indicated that they are transmitting on this time slot. Since none of the neighboring nodes have indicated about reception, the receiver node must be a two hop neighbor. In case 4, one or more of the neighbors have indicated that they are transmitting and one or more of the neighbors have indicated that they are receiving. The transmission and reception indicated can be same or independent of each other. In case 5, the current node is receiving in the time slot. The current node can receive only from one of its neighbors and hence the Nbr Tx field is always marked 1 when the current node is receiving. In case 6, the current node is receiving in the time slot. The current node can receive only from one of its neighbors and hence the value 1 in Nbr Tx field. One of the neighbors has also indicated that it is receiving in this time slot. One possibility is a multicast transmission and other possibility is the following scenario:

A ---------->B ---------- C <---------- D where current node B is receiving from neighbor A while neighbor C is receiving from node D.

In case 7, the current node is transmitting and one of its neighbors is receiving. A node will make entry in the LCM about its transmission only after exchanging scouting messages with its neighbor and hence can mark the particular neighbor as a receiving node in that slot. Hence the Nbr Rx field is always marked 1 when the current node is transmitting. In case 8, the current node is transmitting to one of its neighbors (hence 1 bit in the Nbr Rx) and one of the other neighbors is also transmitting. This is possible in the following scenario:

A<---------- B---------- C ---------->D where B is the current node and is transmitting to node A, C is B's neighbor but it is transmitting to node D.

FIG. 7 is a table 700 showing an entry in a slot allocation table (SAT) according to one implementation. A node maintains a SAT entry for each communication stream it supports through it. Scheduling uses stream numbers to uniquely identify a data stream between a source node and a destination node. Each allocation or reservation of time slots can be identified by a unique stream number at all the nodes concerned. To guarantee the uniqueness of the stream number, the stream number is controlled by the originator of data. For example, a stream can be identified with the couple <MAC address of the source node, Stream ID> where the Stream ID is an integer incremented by the source node every time it starts a new data stream. Each node maintains the data slot allocation for various streams in a Slot Allocation Table (SAT).

As shown in FIG. 7, entries in the SAT may comprise, for example: a stream number entry (Strm # entry) which uniquely identifies the data stream between a source and destination node, a source address (Src Addr) entry which identifies the source MAC address of the data stream, a destination address (Dest Addr entry) which identifies the destination MAC address of the data stream, a Data Slot Allocated entry which identifies the slot(s) allocated for data transmission by this node, an Exp Time entry which identifies a threshold time before slot is freed (refreshed with each packet transmission on this slot), a previous hop (Prev Hop) entry which identifies the previous hop MAC address from where data will be received (this is invalid for source node), a Next Hop entry which identifies the next hop MAC address to which data will be sent (note: this is invalid for a destination node), a Data Buffer entry which identifies a buffer to store data packets while scheduling is in progress, a self receive slot (SelfRx Slot) entry which identifies the slot at which this node is receiving packets from previous hop, a Data Rate entry which identifies the data rate requirement for the data stream, and a Delay entry which identifies the total delay incurred so far by the data stream.

Information in Hello Message

A hello message is transmitted by all the nodes on a periodic basis and it can have a dedicated slot as explained, for example, in a system such as that disclosed in U.S. patent application Ser. No. 11/348607, entitled "System, Method And Apparatus For Reliable Exchange Of Information Between Nodes Of A Multi-Hop Wireless Communication Network" filed Feb. 6, 2006 and assigned to the assignee of the present invention, its contents being incorporated by reference in its entirety herein. In this implementation, a Hello message carries a time slot utilization map in order to distribute slot status information in the neighborhood. A time slot utilization map reflects the slot status as found in the local LCM of the node. The detailed structure of a Hello Message according to one implementation is discussed below.

A node also maintains a Transmission Possible Slot Map (TPSM) and a Reception Possible Slot Map (RPSM) which are used in slot scheduling messages to decide on the slots on which communication will take place. The TPSM and RPSM can be derived from the LCM using the following table.

FIG. 8 is a table 800 showing how the local communication map (LCM) of FIG. 4 can be mapped to a Transmission Possible Slot Map (TPSM) and a Reception Possible Slot Map (RPSM) according to one implementation. The TPSM and RPSM values will now be explained.

In case 1, the current node is free to receive and transmit since the current node has no information about any transmission or reception in the neighborhood and the current node is neither transmitting nor receiving.

In case 2 one or more of the neighbors are receiving on this slot and any transmission from the current node can interfere with the reception; hence TPSM is 0. Since none of the neighbors have indicated transmission, the transmitter must be two hops away and the current node is free to receive from some other neighbor; hence RPSM is 1.

In case 3, one or more of the neighbors are transmitting on this time slot. As such, the current node cannot receive on the same slot due to interference (RPSM=0) but it can transmit to some other neighbor.

In case 4, one or more of the neighbors have indicated that they are transmitting (hence can not receive) and one or more of the neighbors have indicated that they are receiving (hence can not receive). In case 5, the current node is receiving in the time slot, it can only receive one transmission at a time and can not transmit while receiving. In case 6, the current node is receiving in the time slot, and therefore the current node can only receive one transmission at a time and can not transmit while receiving (this condition overrides the condition of reception by the neighbor node). In case 7, the current node is transmitting and can transmit only one stream at a time (TPSM=0). The current node can not receive and transmit at the same time (RPSM=0). In case 8, the current node is transmitting and can transmit only one stream at a time (TPSM=0). The current node can not receive and transmit at the same time (RPSM=0) (this condition overrides the condition of transmission by another neighbor).

Allocation, De-allocation and Maintenance of Slots

When a node needs to communicate with any other node in the network, it indicates its desire to do so to a routing module in the node. The routing module provides at least one route to the destination but will not guarantee the availability of slots. To determine if the given route has enough slots to accommodate the QoS requirements of the traffic, the node needs to scout the route for slots. To scout a route, the source node initiates a slot allocation process and sends out slot allocation messages referred as scouting messages hereon.

A scout message may comprise one of a Scout Request message, a Scout Reply message, a Scout Ack message, a Scout Confirmation message, and a Scout Error message. A detailed explanation of each message will now be provided with reference to FIG. 9.

Figure 9:
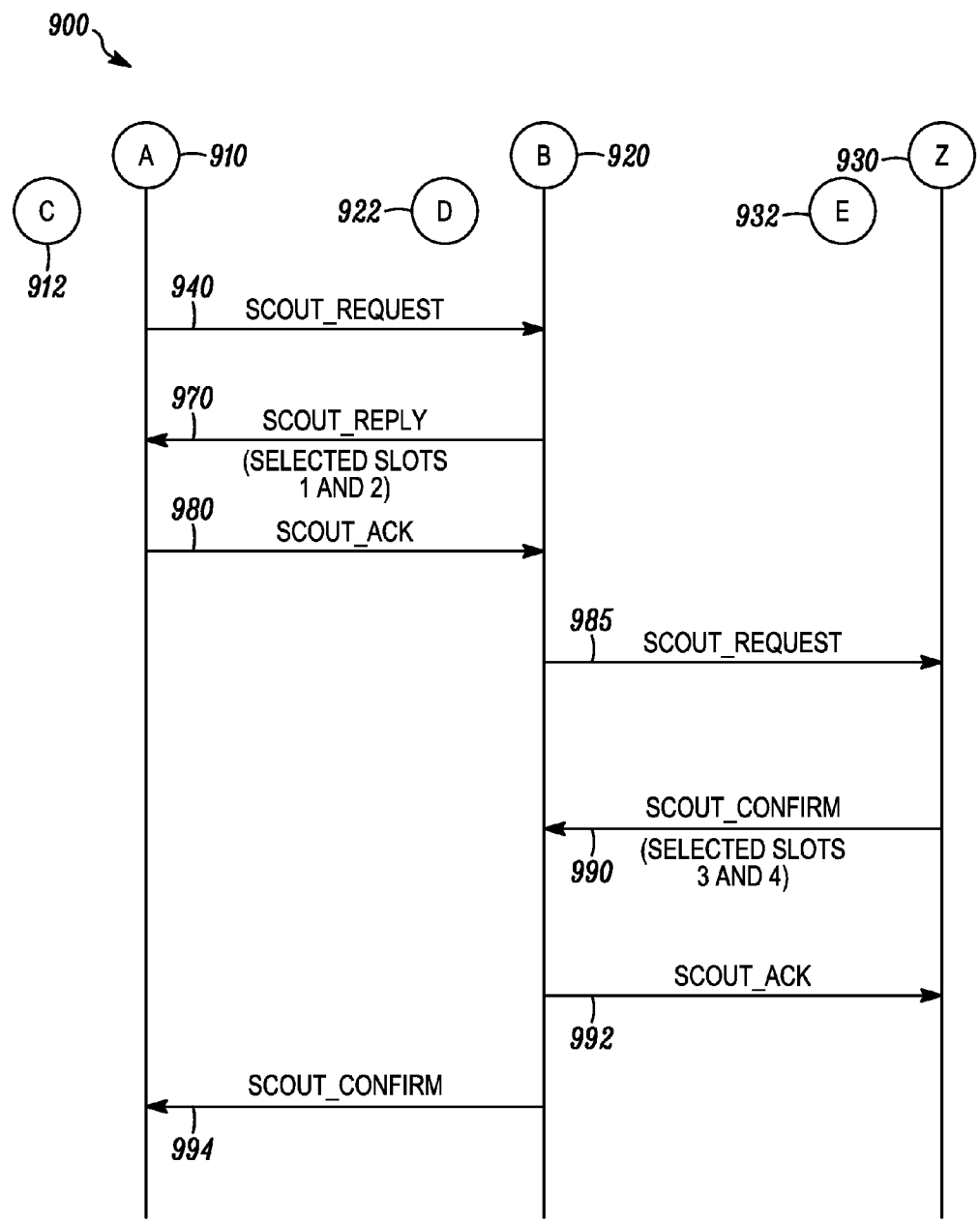
FIG. 9 is a message flow diagram showing a scout message exchange during a slot allocation process according to one implementation.

FIG. 9 is a message flow diagram showing a scout message exchange during a slot allocation process in accordance with some embodiments of the invention.

Scout Request

According to one technique, at step 940, the source node A 910 initiates slot allocation procedure and sends a Scout Request message to the next hop towards destination node Z 930 that contains the map of the slots which are available for transmission (TPSM). The first intermediate node B 920 (next hop) compares this with the slots on which it can receive (RPSM) and picks the appropriate slots.

The source node initiates scheduling when a data packet is received at a source node from an application layer and there is no "Data Slot Allocated" for this stream number in the Slot Allocation Table. The Scout Request message may be a unicast packet.

When generating the Scout Request message, the source node will provide the following information in Scout Request message: a stream number, a source MAC Address, a destination MAC Address, Transmission Possible Slots (TPSM), a minimum data rate, and a maximum delay.

The stream number can be used to reserve the slots. The source MAC address is the MAC address of the node initiating the Scout Request message. The destination MAC address is the MAC address of the final destination of the data stream for which time slots need to be reserved. TPSM carries the slot numbers on which the data transmission is possible. The minimum data rate is the data rate which needs to be maintained at all the intermediate nodes to satisfy the QoS requirement of this particular data stream. (This value can be transmitted as it is or can be converted into number of time slots required per frame at a given data rate.) The maximum delay is the maximum delay which packets of this data stream can sustain while traversing along the route and still maintaining the QoS requirement. (This value can be transmitted as it is or can be converted into number of frames or slots.)

Processing a Scout Request Message

The Scout Request message is a directed message and is processed only by the node for which it is destined; other nodes simply discard it. The node processing the Scout Request message first checks to determine if the Scout Request message meets the requirements of the data stream. To do so, in one implementation, the Scout Request message goes through the following checks. The destination node first compares the TPSM map sent by the previous hop with the local Reception Possible Slot Map (RPSM) to determine if it can receive on the time slot (or slots depending on the data rate) which is/are indicated free in TPSM. If the destination node finds common slot (or slots) in the TPSM and RPSM map, it will then check if the QoS requirements are met (i.e., bandwidth and delay requirements if indicated in the Scout Request message). If either slots are unavailable to support this stream or QoS requirements can not be met, a Scout Error message will be sent to mark the failure of scheduling as described below. If slots can be allocated with QoS limits, the next hop node replies back with a Scout Reply message.

Scout Reply Message

At step 970, the next hop node B 920 indicates the selected slots 1 and 2 in a Scout Reply message. A node generates a Scout Reply message and sends it to the previous hop when an intermediate node can find necessary slots which are common in TPSM of a previous node and its own RPSM, and the QoS requirements are met. A Scout Reply message is a unicast message (e.g., not forwarded by the receiving node) which has the information about the slot(s) which have been picked by the intermediate node to receive data. A Scout Reply message can include a stream number and a slot allocated field. The stream number uniquely identifies the source, destination pair traffic. The slots allocated field indicates slot number(s) selected for reception by next hop (or transmission for previous hop). Node generating Scout Reply message updates its LCM and SAT table entries by marking Selffx for the selected slots as 1. Nodes hearing Scout Reply message (in FIG. 9, nodes D and node E) update their LCM table by marking NbrRx for selected slot as 1.

Scout Ack Message

At step 980, the source node A 910 announces the picked slots in a Scout Ack message. The scout acknowledgement (Scout Ack) message is generated after receiving and processing Scout Reply message. Scout Ack transmission allows neighbor nodes (in FIG. 9, node C 912) to update the slot status in their local LCM tables. The Scout Ack message contains the slot number(s) that this node will be using for transmission. The Scout Ack message contains a stream number field and a slots allocated filed which specifies the slot number(s) selected for transmission. The Scout Ack message is a broadcast message and is not forwarded further. The node generating the Scout Ack message will update its LCM table by marking SelfTx as 1 for the allocated slot(s). Nodes receiving the Scout Ack message use it to update their LCM table by making NbrTx as 1 (if not already 1) and add the originator in NbrTx List (if not already present).

This three way message exchange (Scout Request, Scout Reply and Scout Ack) in steps 940, 970, 980 completes the slot allocation at the source node A 910. This exchange also allows the neighboring nodes 912, 922 to update the LCM table according to the slots selected. The process (steps 940, 970, 980) is repeated at all the intermediate nodes.

Slot allocation in one embodiment continues by forwarding the Scout Request message by node B 920 towards the destination node Z 930 as shown in transmission 985. In FIG. 9, at step 985, node B 920 sends the Scout Request message from node A 910 towards destination node Z 930. Before forwarding the Scout Request message, a number of fields are updated in the Scout Request message. For example, the intermediate node appends its modified TPSM, updates QoS related fields (e.g. data rate, delay incurred so far).

Scout Confirmation Message

When the destination node Z 930 receives a Scout Request message, it perform similar checks as done for generating Scout Reply message, but instead it replies back with a Scout Confirmation message. At step 990, the destination node Z 930 sends a Scout Confirmation message which marks the completion of end-to-end allocation. Slots selected for communication between node B 920 and node Z 930 are included in this Scout Confirmation message. A Scout Confirmation message is a unicast message sent by a destination node to its previous hop node if all the intermediate nodes, including the node itself, have necessary slots to meet the QoS requirement of the data stream. Node B 920 acknowledges the receipt of Scout Confirmation and announces selected slots to its neighbor nodes by broadcasting a Scout Ack message as shown in step 992. Node B 920 then forwards the Scout Confirmation message to the next hop towards the source node as shown in step 994, but without the field containing the selected slot numbers (the slot number/numbers field is used only the destination node to save one Scout Reply message). The reception of the Scout Confirmation message by source node A 910 marks the end of the slot allocation procedure for this particular stream (here, between source node A 910 and destination node Z 930).

Scout Error

A Scout Error message is generated in a number of different cases. For example, a Scout Error message is generated if none or an insufficient number of common slots are found between the TPSM of transmitting node and RPSM of receiving node. A Scout Error message is also generated if the total delay incurred is more than the maximum allowed for the data stream. A Scout Error message is also generated when a Slot Table Entry expires. The Scout Error message is generated by the node which detects any of the above condition (Error Detecting Node). All nodes receiving the Scout Error message reset the slot(s) status in the LCM to be free which were reserved for the particular stream number indicated in the message. The Scout Error message can be sent with broadcast or unicast address. The Scout Error message contains a valid or an invalid slot number, the stream number, slot number(s) and error type fields.

When a node fails to allocate a time slot or the total delay increases the maximum delay during slot allocation process, it sends out a unicast reverse Scout Error message (for previous hop toward source node) with slot number "Invalid". The previous hop node will process the Scout Error message by removing the scout table entry for this stream number and freeing up the slot. It will then forward the Scout Error message in the direction towards source node. When this Scout Error message reaches source node, it will broadcast a Scout Error message to tell neighbors about the slot it is going to free.

Each slot allocation has an expiry time. With each data packet transmission/reception, the expiry timer is refreshed. If the slot is not used for certain period of time, it is considered unused and needs to be freed. In case of slot expiry, the node broadcasts a Scout Error message by listing expired slot(s). This Scout Error message is processed by all the neighbor nodes and not forwarded further. Neighbor nodes free the slot(s) indicated in the Scout Error message.

As described above, a distributive TDMA time slot allocation procedure can be used to allocate TDMA time slots for communication streams. In one embodiment, nodes perform a Scout message exchange to reserve TDMA time slots and maintain spatial reuse. A particular node can reserve one or more TDMA time slots to fulfill various Quality of Service (QoS) requirements associated with a particular communication stream. The QoS requirements may be specified, for example, using at least one of a plurality of fields for the communication stream including, but not limited to, a bandwidth request field, a maximum or minimum data rate field, a maximum or minimum delay field, a jitter field and a total delay incurred field.

Figure 10:
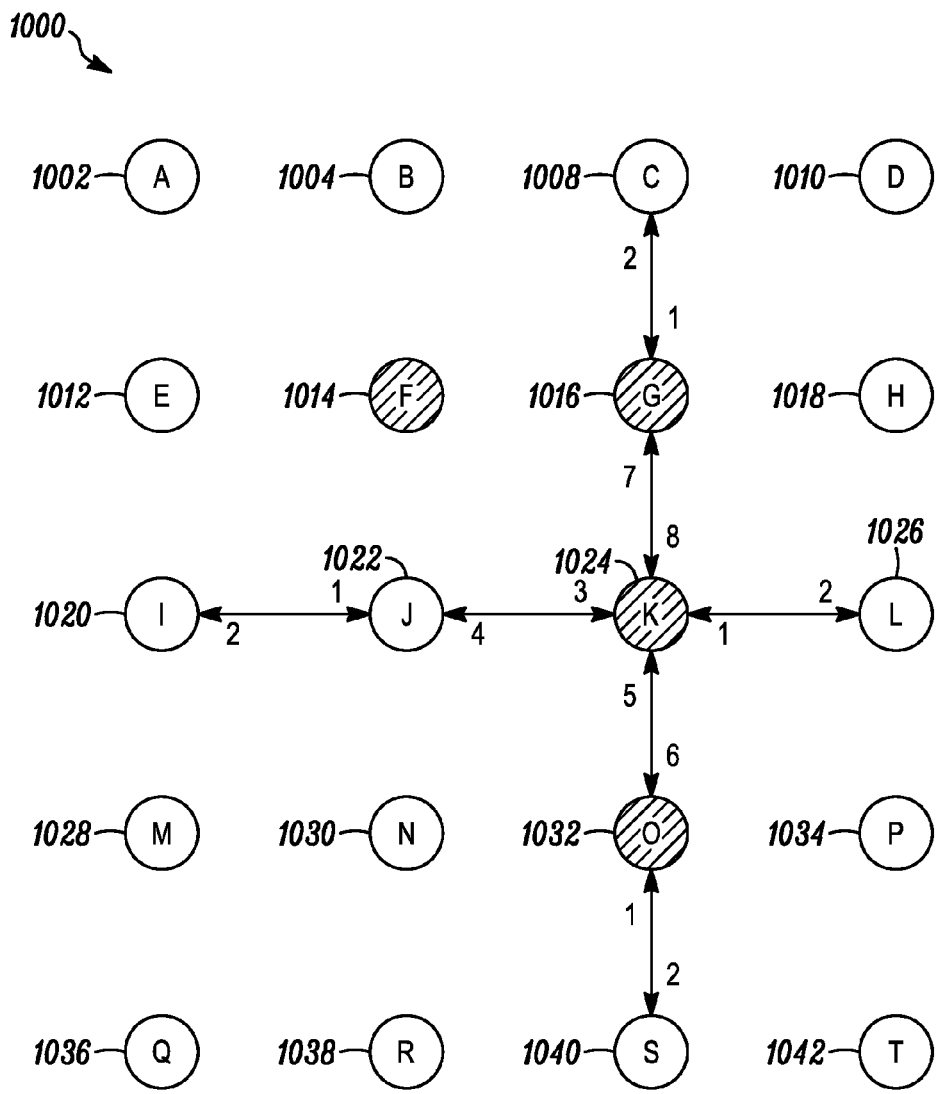
FIG. 10 is a block diagram of one example of communication network which illustrates an example scenario where communication streams are in progress between nodes in the communication network.

FIG. 10 is a block diagram of one example of communication network 1000 which includes node A 1002 through node T 1042. FIG. 10 illustrates an example scenario where communication streams are in progress (from node I 1020 to node L 1026 and from node S 1040 to node C 1008).

In this scenario, it is assumed that TDMA time slots 1-8 are available for TDMA communication and that all of these TDMA time slots 1-8 are currently being used to support the ongoing communication streams. Specifically, node I 1020 has one communication stream in progress with node L 1026 with TDMA time slots 1-4 allocated between node I 1020 and node L 1026, and node S 1040 has one communication stream in progress with node C 1008 with TDMA time slots 1, 2 and 2-8 allocated between node S 1040 and node C 1008. Notably, spatial reuse may allow additional communication streams to be supported.

In this example, node F 1014 eventually attempts to start its communication to node O 1032 through node G2616 and node K 1024. In a normal TDMA system, node G2616 and node K 1024 would not have TDMA time slots left to allocate for the requested communication stream by node F 1014, and therefore this communication stream would not go through. As such, if node F 1014 is a high priority user (i.e., higher priority than other nodes) and has a communication stream which needs to go through, then this communication stream would not go through. In other words, in conventional TDMA networks, if QoS requirements can not be met for a communication stream (e.g., due to unavailability of free TDMA time slots or other reasons), service for the communication stream is denied. In such scenarios, it would be desirable to provide techniques for allowing node F 1014 to free up and allocate appropriate time slots along the route to meet the QoS requirements of the high priority communication stream.

Embodiments of the present invention relate to techniques for supporting user priorities for each user/node in a multi-hop TDMA system, and to other techniques for preemption based on the user priorities which can allow a high priority user to preempt lower priority communication streams to free up TDMA time slots used by low priority users and accommodate a high priority communication stream. Such techniques are useful in networks, such as a public safety networks, for example, when a fire chief wants to communicate a mission critical message, he can be assigned a high user priority which will help ensure that his/her communication will always go through.

Supporting User Priority and Preemption

Techniques are provided for supporting user priorities for each user/node in a multi-hop TDMA system, and for preemption based on the user priorities which can allow a high priority user to preempt lower priority communication streams to free up TDMA time slots used by low priority users and accommodate a high priority communication stream from a source node of the high priority user. For instance, in the example described above with reference to FIG. 10, where node F 1014 is a high priority user (i.e., higher priority than other nodes), techniques are provided which support user priority and preemption so that the communication stream from node F 1014 can be communicated to node O 1032 (through node G 1616 and node K 1024) despite that node G2616 and node K 1024 do not have TDMA time slots left to allocate.

To support user priority and preemption, as described below with reference to FIGS. 11-14, nodes in the network exchange user priority, stream-identifiers (IDs) and stream priority values. Details of information exchange and usage is described below.

Figure 11:
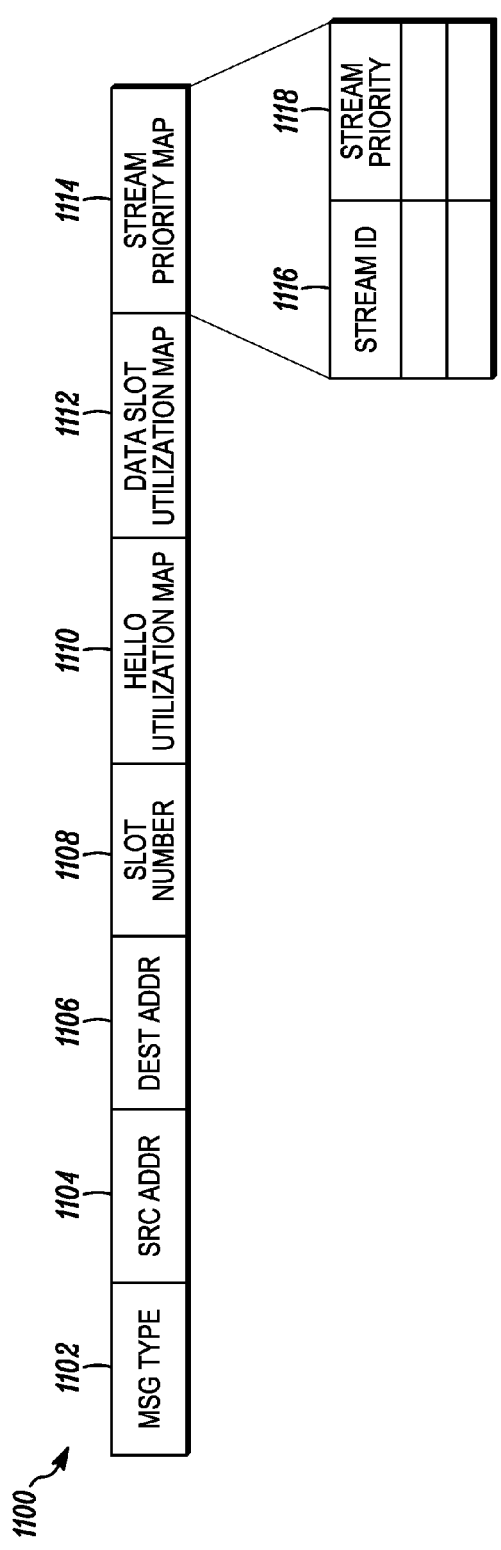
FIG. 11 is a data structure diagram illustrating a format of a HELLO message transmitted by each node according to at least some embodiments of the invention.

FIG. 11 is a data structure diagram illustrating a format of a HELLO message 1100 transmitted by each node according to at least some embodiments of the invention. In this implementation, each HELLO message 1100 includes a stream priority map (SPM) 1114 which includes one or more stream-identifier (ID) entries 1116 for communication stream(s) supported by the node, and respective stream-priority value entries 1118 associated with each stream ID entry 1116 (e.g., with each communication stream supported that the particular source or originator node). In other words, for each communication stream a particular node currently supports, the node sends a stream-ID for that particular communication stream and a stream-priority value for that particular communication stream.

In this implementation, each HELLO message 1100 includes a message type entry 1102, a source address (Src Addr) entry 1104 which identifies the source MAC address of the data stream, a destination address (Dest Addr) entry 1106 which identifies the destination MAC address of the data stream, a slot number entry 1108 which identifies a Hello slot number assigned to this node for Hello message transmission, a HELLO utilization map 1110 which provides the information of current Hello Slot usage in this node's neighborhood based on the Hellos heard by the node, a Data Slot Utilization Map (DSUM) entry 1112 which identifies the slot(s) allocated for data transmission by this node in the neighborhood, and a stream priority map (SPM) 1114. The SPM 1114 includes one or more stream ID entries 1116 which uniquely identify data streams between the source/originator nodes and destination node, and respective or corresponding stream-priority value entries 1118 associated with each stream ID entry 1118.

Figure 12:
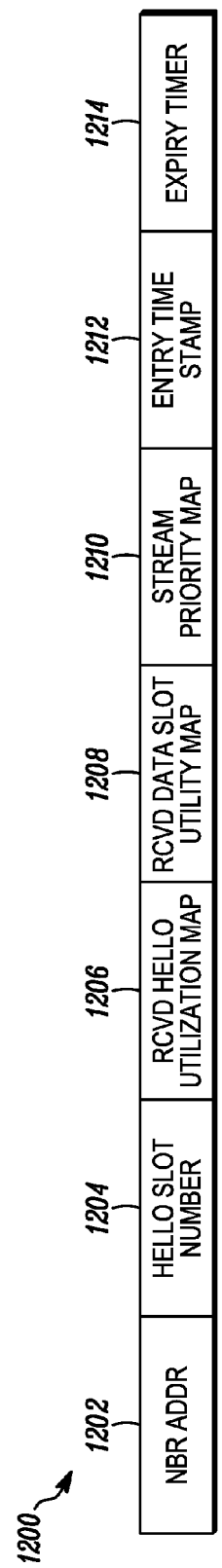
FIG. 12 is a data structure diagram illustrating a neighbor table according to at least some embodiments of the invention.

FIG. 12 is a data structure diagram illustrating a neighbor table 1200 according to at least some embodiments of the invention. The neighbor table 1200 includes information received in Hello messages 1100. In other words, for each neighbor node, the neighbor table 1200 also includes information received in HELLO messages 1100 including one or more stream-identifiers (IDs) and their respective stream priority values. In this implementation, each neighbor table 1200 includes a neighbor address (Nbr Addr) entry 1202 which identifies a MAC address of a neighbor node, a HELLO slot number entry 1204 which identifies a Hello Slot assigned to neighbor node for periodic Hello message transmission, a received HELLO utilization map 1206 which identifies Hello slot usage as seen by neighbor node, a received Data Slot Utilization Map (DSUM) entry 1208 which identifies the slot(s) allocated for data transmission by this node in the neighborhood, a stream priority map (SPM) 1210, an entry time stamp 1212 which notes the time when this neighbor entry was last refreshed or created, and an expiry timer entry 1214 which denotes the time after which this neighbor entry becomes invalid. Whenever a Hello is received from neighbor, its corresponding neighbor entry is refreshed and expiry timer is updated. As described above with reference to FIG. 11, the SPM 1210 includes one or more stream ID entries which uniquely identify data streams between the source/originator nodes and destination node, and respective or corresponding stream-priority value entries associated with each stream ID entry.

FIG. 13 is a data structure diagram illustrating a scout request message (SRM) 1300 according to at least some embodiments of the invention. The SRM 1300 is transmitted by a source or originator node which originates a particular communication stream. During a slot allocation procedure, the scout request message (SRM) 1300 is used to distribute stream ID(s) and associated stream-priority value(s) to nodes along the path towards the destination node. SRM 1300 carries stream ID that uniquely identifies a communication stream between a pair of source and destination node and user priority of node that originated this communication stream. These values remain same as SRM is forwarded along the route towards the final destination.

In this implementation, each SRM 1300 includes a message type entry 1302, a source address (Src Addr) entry 1304 which identifies the source MAC address of the data stream, a destination address (Dest Addr) entry 1306 which identifies the destination MAC address of the data stream, a Transmission Possible Slot Map (TPSM) table entry 1308 which identifies time slots on which transmission is currently possible, a QoS values entry 1309 which specifies QoS requirements such as total delay or bandwidth constraints desired for this particular communication stream, a stream ID entry 1310 which uniquely identifies data streams between the source/originator nodes and destination node, and an originator priority entry 1312 which specifies the user priority of the source or originator node which originates a particular communication stream.

FIG. 14 is a data structure diagram illustrating a Scout Allocation Table (SAT) 1400 according to at least some embodiments of the invention. In contrast to the SAT 700 of FIG. 7, the SAT 1400 also includes other information received in Scout Request Messages (SRMs) 1900. When a Scout Request message is successfully processed at a node i.e. successful data slot allocation to support this stream, node adds an entry for this stream in its Slot Allocation Table. Stream ID 1402 identifies the communication stream; Data Slot Allocated 1410 identifies the slots allocated to support this stream. User priority value of originator node of communication stream is stored as Stream Priority 1426.

In this implementation, each SAT 1400 stores entries which include a stream ID entry 1402 which uniquely identifies a data stream between a source and destination node, a source address (Src Addr) entry 1404 which identifies the source MAC address of the data stream, a destination address (Dest Addr) entry 1406 which identifies the destination MAC address of the data stream, a Data Slot Allocated entry 1410 which identifies the slot(s) allocated for data transmission by this node, an expiry time entry 1412 which identifies a threshold time before slot is freed (refreshed with each packet transmission on this slot), a previous hop (Prev Hop) entry 1414 which identifies the previous hop MAC address from where data will be received (this is invalid for source node), a next hop entry 1416 which identifies the next hop MAC address to which data will be sent (this is invalid for destination node), a data buffer entry 1418 which identifies a buffer to store data packets while scheduling is in progress, a self receive slot (SelfRx Slot) entry 1420 which identifies the slot at which this node is receiving packets from previous hop, a data rate entry 1422 which identifies the data rate requirement for the data stream, a delay entry 1424 which identifies the total delay incurred so far by the data stream, and a stream-priority value entry 1426 associated with the stream ID entry 1402.

According to embodiments described below, techniques are provided which support user priority and preemption in certain scenarios or conditions. During a TDMA time slot allocation procedure a scout request message (SRM) 1300 such as that described above with respect to FIG. 13 is transmitted by the source or originator node and used to distribute stream ID(s) and associated stream-priority value(s) (which is derived from originator priority field in SRM) to nodes along the path towards the destination node. If a node finds no free slots available to support a communication stream of a high priority user by looking at a stream-priority value, techniques are provided which can allow the node to preempt a lower priority communication stream. For example, in some embodiments, the node can preempt and free a low priority communication stream that goes through the node. In other embodiments, the node can transmit a PREEMPT message to a selected neighbor node to release slots used to support a lower priority communication stream.

Figure 15:
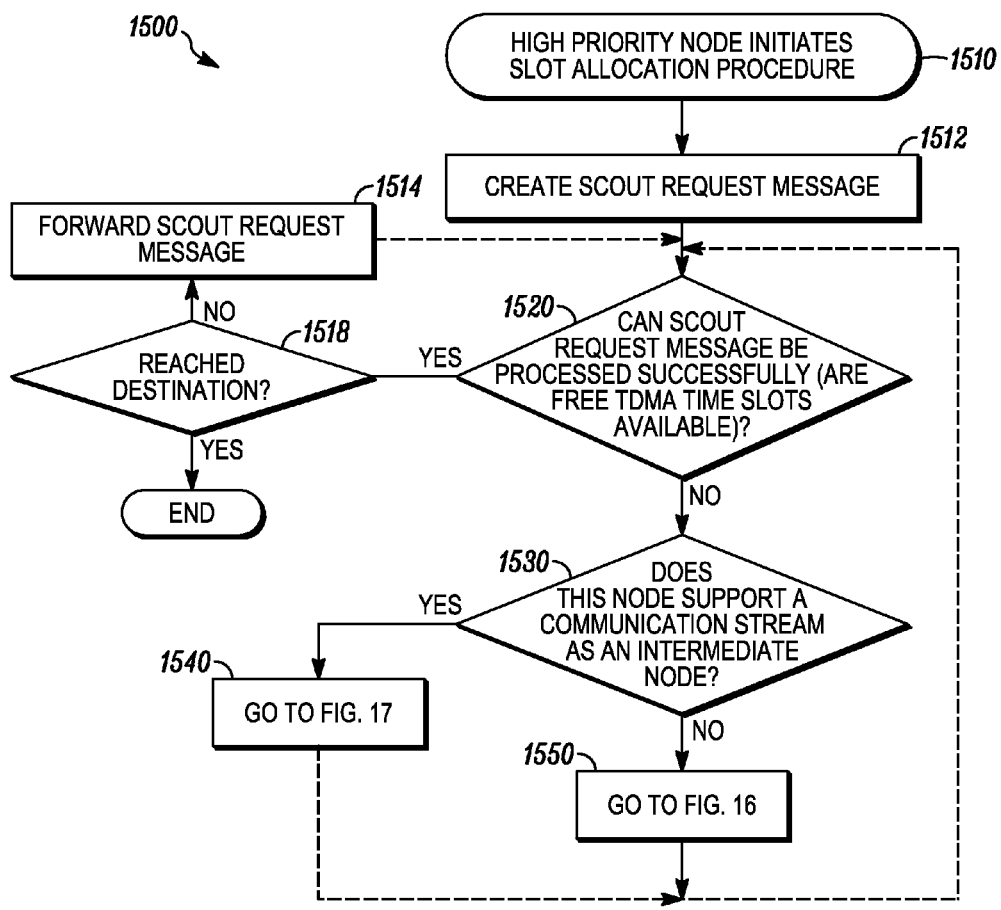
FIG. 15 is a flowchart illustrating a method for allowing a high priority source node to preempt a lower priority communication stream according to at least some embodiments of the invention.

FIG. 15 is a flowchart illustrating a method 1500 for allowing a high priority source node to preempt a lower priority communication stream according to at least some embodiments of the invention.

The method 1500 begins at step 1510 when the high priority source node decides to start communication stream and initiates a slot allocation procedure. At step 1512, the node creates a scout request message (SRM) to initiate the slot allocation procedure. At step 1520, the node checks if the SRM can be processed successfully (i.e. whether data slots are available to support the stream from the node). In one implementation, TPSM and RPSM tables are used to determine whether TDMA slots are available.

If the node determines that the SRM can be processed (i.e., TDMA slots are available to support this communication stream), then the method 1500 proceeds to step 1518, where the node determines whether it is the destination node, and if not, then the SRM is forwarded to next-hop towards destination at step 1514. Forwarding and processing of Scout Request continues (i.e. scheduling slots and generating Scout Reply, Scout Ack as part of previously defined slot scheduling procedure) at each intermediate node until the destination node is reached. If the node determines that it is the destination node at step 1518 and Scout Request is processed successfully by generating Scout Confirm message, then the method 1500 ends. In other words, when the SRM reaches and processed successfully at the destination node, slot allocation is successfully completed and the method 1500 ends.

SRM processing may fail at either the originator node or at any intermediate node towards the destination. If the SRM can not be processed successfully (i.e., no TDMA slots are available to support this communication stream), then SRM processing fails and the method 1500 proceeds to step 1530, where the node determines whether it supports one or more communication streams through itself as an intermediate node (i.e., whether the node is serving as an intermediate node for a communication stream). This step can occur at the source node or at an intermediate node towards the final destination. If the node is not serving as an intermediate node for a communication stream, then, as indicated at step 1550, the method continues as described below with reference to FIG. 16. By contrast, if the node is serving as an intermediate node for a communication stream then the method 1500 proceeds to step 1540 and the method continues as described below with reference to FIG. 17.

Figure 16:
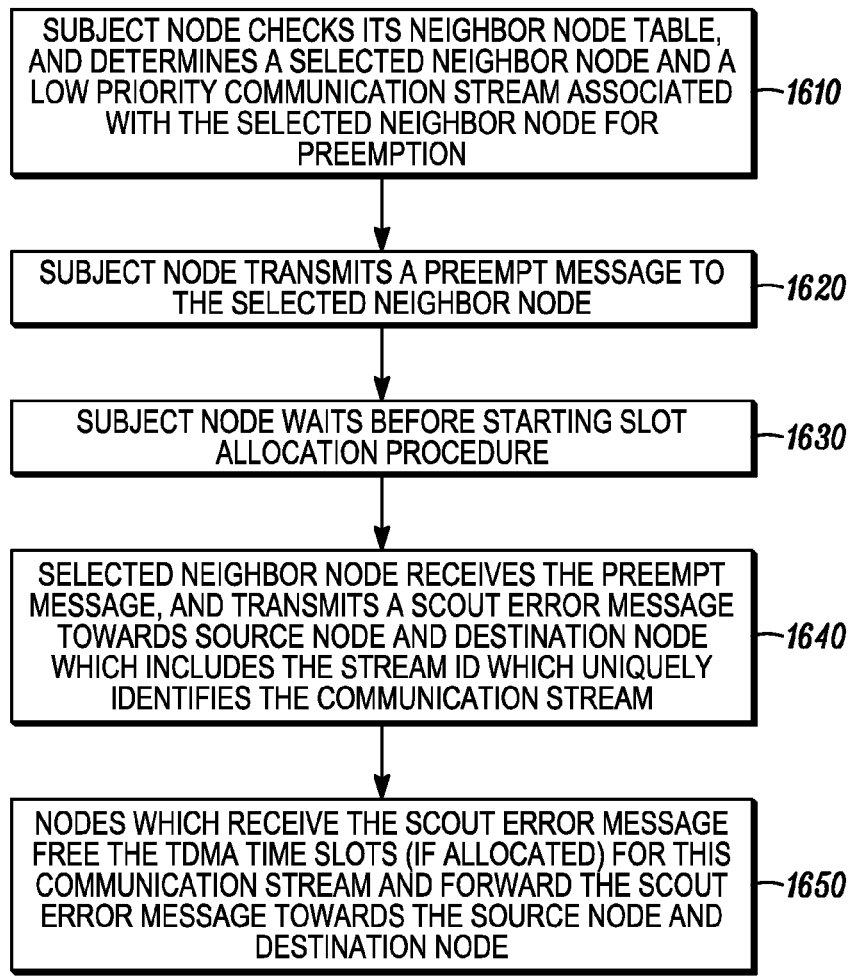
FIG. 16 is a flowchart illustrating a method for preemption to support high priority user according to at least some embodiments of the invention.

FIG. 16 is a flowchart illustrating a method 1600 for preemption to support high priority user according to at least some embodiments of the invention. Steps in FIG. 16 are executed when a node determines the unavailability of data slots and it is not supporting any communication stream through itself or supported streams are not of low priorities. In the following description of FIG. 16, the term "subject node" can refer to either a high priority source node or an intermediate node depending on the implementation; however, the logical steps are the same.

The method 1600 begins at step 1610, where the subject node checks its neighbor node table, and determines a selected neighbor node and a low priority communication stream associated with the selected neighbor node for preemption. For instance, in one implementation, the selected neighbor node can be the neighbor node supporting the lowest priority communication stream of all the communication streams currently supported by all neighbor nodes in the neighborhood. In another implementation, the selected neighbor node can be a next hop node towards the destination node, and the low priority communication stream for preemption can be the lowest priority communication stream supported by the selected neighbor node. At step 1620, the subject node transmits a PREEMPT message to the selected neighbor node so that the selected neighbor node stops supporting the low priority communication stream, and therefore frees up the TDMA time slots being used by the low priority communication stream. At step 1630, the subject node waits for a time period before starting its slot allocation procedure. At step 1640, when the selected neighbor node receives the PREEMPT message, and the selected neighbor node transmits a Scout Error message (SEM) towards the source node of the communication stream and destination node of the communication stream. The Scout Error message includes the stream ID which uniquely identifies the communication stream. At step 1650, the nodes which receive the Scout Error message free the TDMA time slots (if allocated) for this communication stream and forward the Scout Error message towards the source node of the communication stream and destination node of the communication stream.

Figure 17:
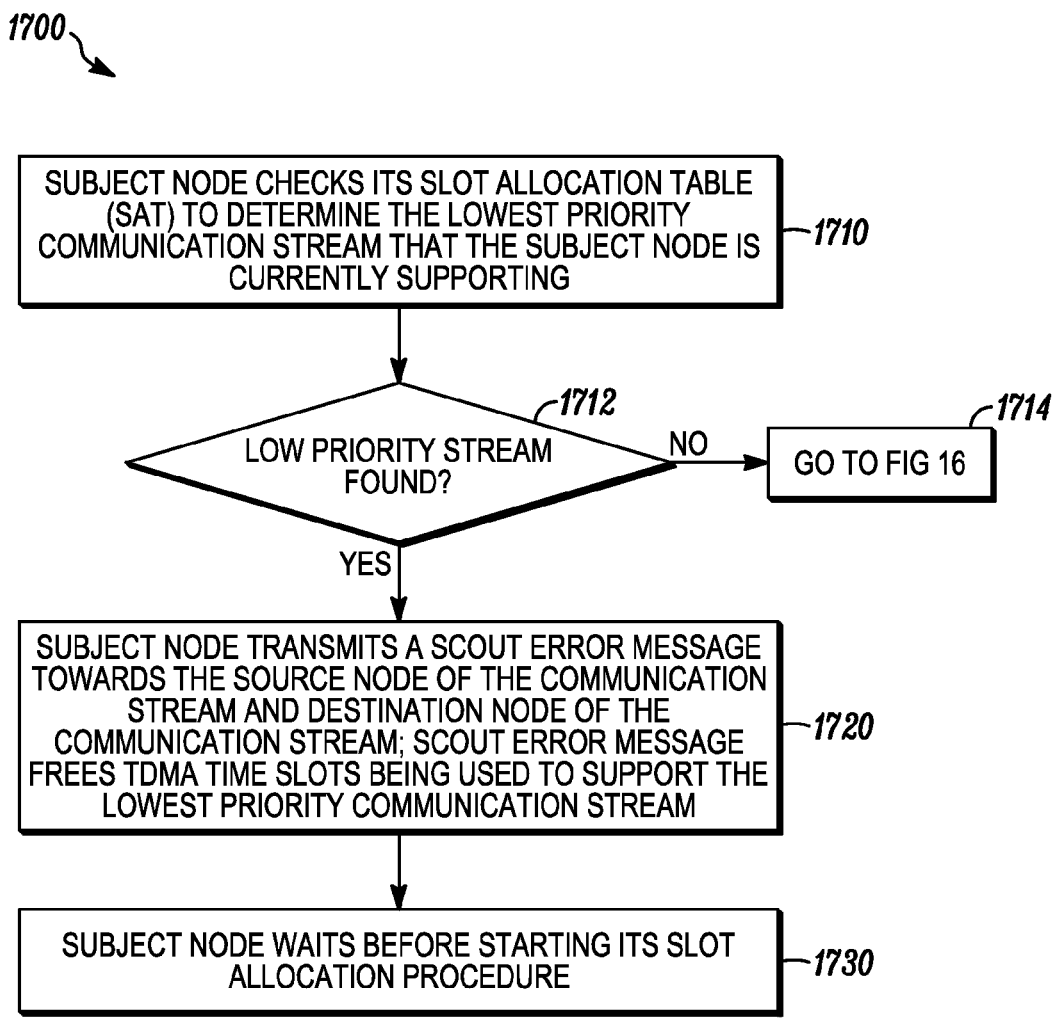
FIG. 17 is a flowchart illustrating techniques for preemption to support high priority user according to at least some embodiments of the invention.

FIG. 17 is a flowchart illustrating techniques for preemption to support high priority user according to at least some embodiments of the invention. Steps in FIG. 17 are executed when a node determines the unavailability of data slots and it is supporting one or more communication stream(s) through itself. In the following description of FIG. 17, the term "subject node" can refer to either a high priority source node or an intermediate node depending on the implementation; however, the logical steps are the same.

The method 1700 begins at step 1710, where the subject node checks its Slot Allocation Table (SAT) to determine the lowest priority communication stream that the subject node is currently supporting. This is done by taking the user priority of originator node (i.e. priority value of current stream) carried in Scout Request message and checking it against the stream priority values of already supported streams in SAT. Stream priority value of communication stream is the user priority value of the originator node of that communication stream. At step 1712, the subject node determines whether there is a low priority communication stream. If the subject node determines that a low priority communication stream is not supported, then the method 1700 proceeds to FIG. 16 (described above). If the subject node determines that a low priority communication stream is supported, then the method 1700 proceeds to step 1720, where the subject node transmits a Scout Error message towards the source node of the communication stream and destination node of the communication stream. Nodes which receive the Scout Error message free the TDMA time slots for this lowest priority communication stream and forward the Scout Error message towards the source node of the communication stream and destination node of the communication stream.

At step 1730, the subject node waits for a time period before starting its slot allocation procedure.

Figure 18:
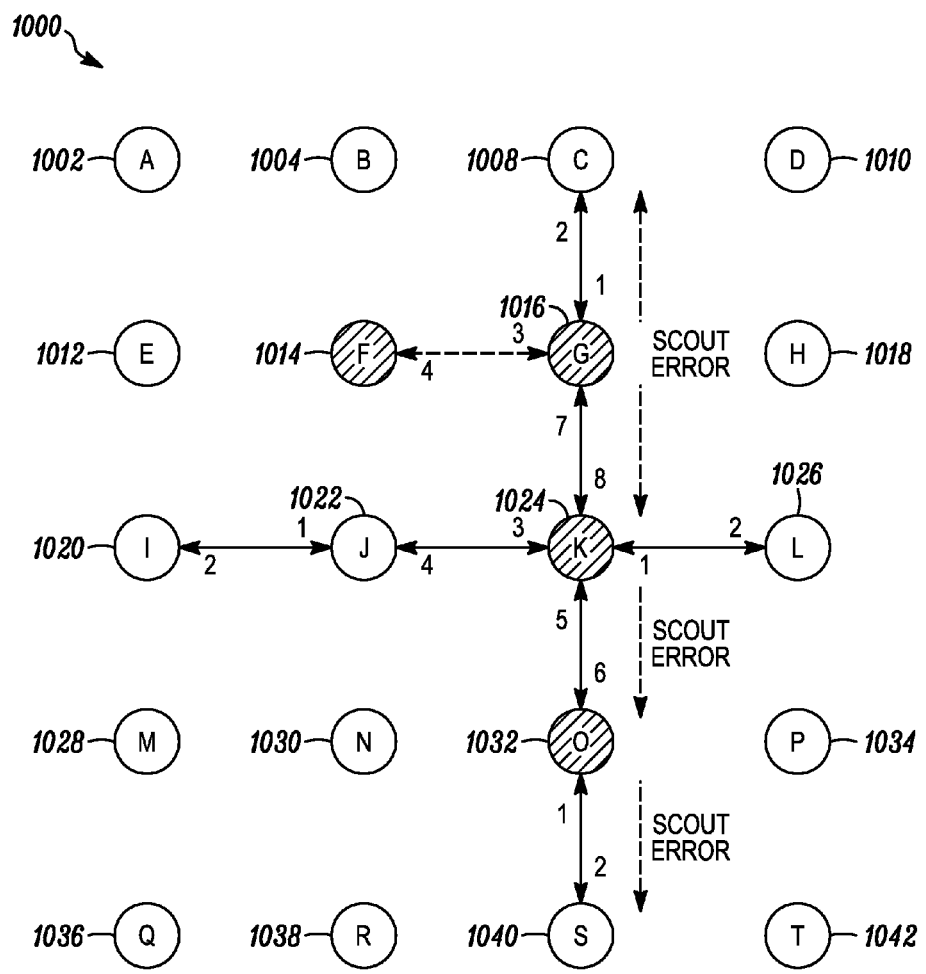
FIG. 18 is a block diagram of the communication network of FIG. 16 at a later time when node F attempts to start a communication stream according to at least some embodiments of the invention.

FIG. 18 is a block diagram of the communication network 1000 of FIG. 10 at a later time when node F attempts to start a communication stream according to at least some embodiments of the invention.

As described previously herein with regards to FIG. 10, it is assumed that TDMA time slots 1-8 are available for TDMA communication, that node I 1020 has one communication stream in progress with node L 1026 with TDMA time slots 1-4 allocated between node I 1020 and node L 1026, that node S 1040 has one communication stream in progress with node C 1008 with TDMA time slots 1, 2 and 5-8 allocated between node S 1040 and node C 1008, and that TDMA time slots 1-8 are currently being used in the neighborhood of node K 1024. It is also assumed that the user priority of node F 1014 is greater than the user priority of node I 1020, and that the user priority of node I 1020 is greater than the user priority of node S 1040.

In this example, it assumed that the nodes in the network 1000 support user priority and preemption techniques described above. As such, when node F 1014 attempts to start a communication to node O 1032 through node G 1016 and node K 1024, node F 1014 transmits a Scout Request message to node G 1016. Node G 1016 cannot find any free TDMA time slots to support the stream from node F 1014 because node G 1016 is supporting the stream between node S 1040 and node C 1008. However, because the stream-priority value associated with the communication stream between node S 1040 and node C 1008 is less than the stream-priority value associated with the communication stream between node F 1014 and node O 1032 (i.e., priority value associated with node S 1040 is less than the priority value associated with node F 1014), node G 1016 transmits a Scout Error message towards node K 1024 and node C 1008. Node K 1024 forwards the Scout Error message along to node O 1032, and node O 1032 forwards the Scout Error message along to node S 1040. This Scout Error message travels all the way to node S and frees up the TDMA time slots currently allocated slots to support the communication stream between node S 1040 and node C 1008. Thus, although node K 1024 does not have TDMA time slots left to allocate for the communication stream requested by node F 1014, because node F 1014 is a high priority user (i.e., has higher priority than other nodes) node F 1014 will free up the slots when it receives Scout Error message to terminate stream between node S and C. Node G 1016 waits for limited time before continuing the slot allocation procedure initiated by node F 1014 to allocate TDMA time slots for the communication stream between node F 1014 and node O 1032.

Figure 19:
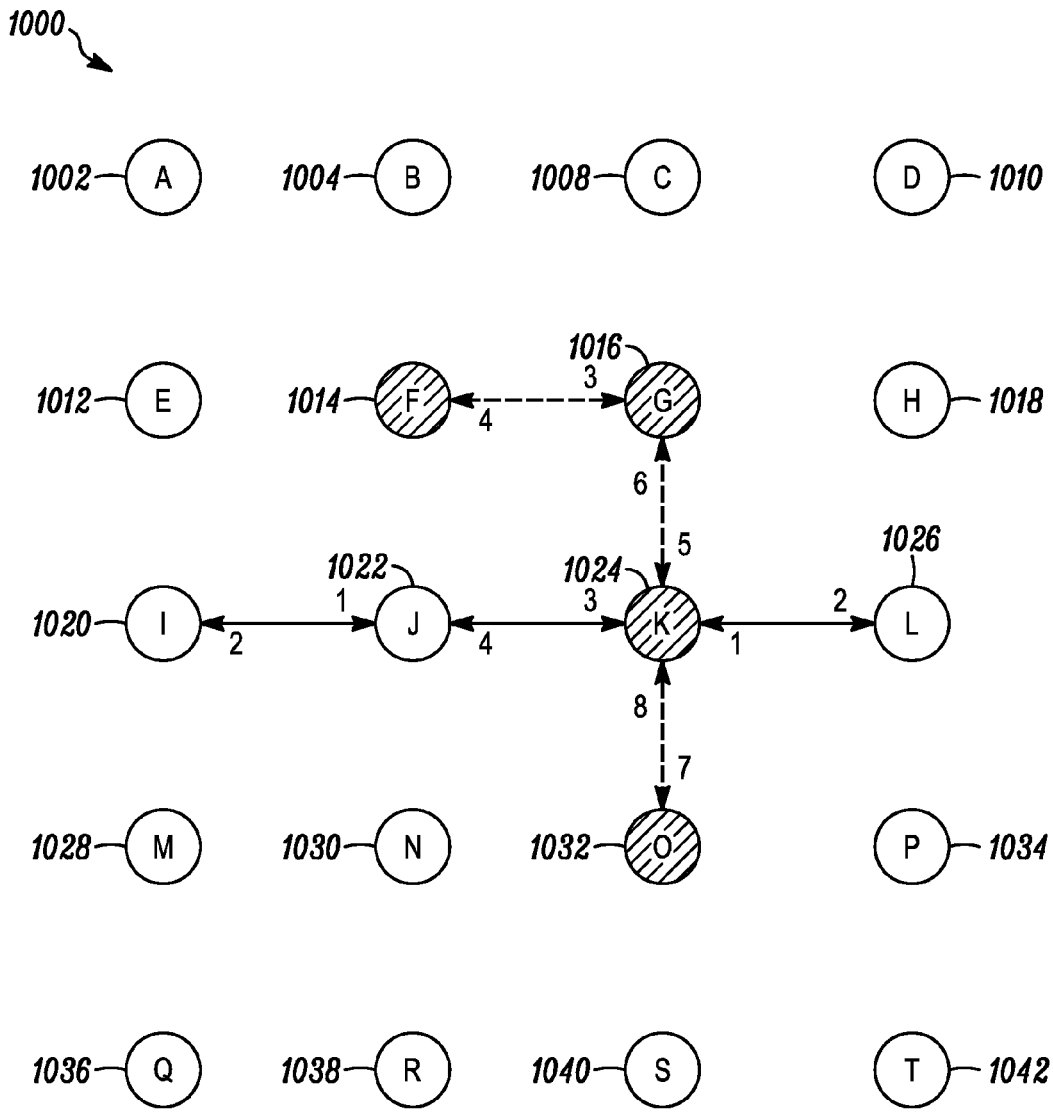
FIG. 19 is a block diagram of the communication network of FIG. 18 illustrating slot allocations after preemption of a low priority stream according to at least some embodiments of the invention.

FIG. 19 is a block diagram of the communication network 1000 of FIG. 18 illustrating slot allocations after preemption of a low priority stream according to at least some embodiments of the invention. As illustrated in FIG. 19, service for the communication stream from node F 1014 is nevertheless granted and TDMA time slots 3, 4 are allocated for this communication stream.

In the foregoing specification, specific embodiments of the present invention have been described. However, one of ordinary skill in the art appreciates that various modifications and changes can be made without departing from the scope of the present invention as set forth in the claims below.

Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. In a multi-hop Time division multiple access (TDMA) network comprising a source node seeking to transmit a first communication stream having one or more quality of service (QoS) requirements to a destination node, a method for allowing the source node to preempt a lower priority communication stream, the method comprising:
preparing to start the first communication stream at the source node;
determining, at the source node, whether one or more free time slots are available to support the QoS requirements of the first communication stream; and
when the source node determines that the free time slots are not available to support the QoS requirements of the first communication stream and when the source node is not serving as an intermediate node for a communication stream:
identifying a lowest priority stream supported at a neighbor node by evaluating a Neighbor Table containing one or more supported stream identifiers (IDs) and their respective stream priority values supported streams and their priorities, wherein the lowest priority stream has a lower priority than the first communication stream, and
transmitting a PREEMPT message to the neighbor node to release one or more TDMA slots being used for the lowest priority stream for use in communicating the first communication stream;
when the source node determines that the free time slots are not available to support the QoS requirements of the first communication stream and when the source node is serving as an intermediate node for a communication stream:
identifying a lowest priority stream supported at the source node by evaluating a Slot Allocation Table (SAT) of the source node, wherein the lowest priority stream has a lower priority than the first communication stream, and
transmitting one or more Scout Error messages including a stream identification (ID) which uniquely identifies the communication stream to one or more nodes along a path of the identified lowest priority stream to free one or more TDMA slots used by the lowest priority stream for use in communicating the first communication stream.

2. A method according to claim 1, further comprising:
transmitting, when the neighbor node receives the PREEMPT message, a Scout Error message from the neighbor node towards a source node and a destination node of the lowest priority stream, wherein the Scout Error message comprises a stream ID which uniquely identifies the lowest priority stream; and
freeing the time slots being used to support the lowest priority stream ,identified by the stream ID in the Scout Error message, at the nodes which receive the Scout Error message for use by the source node in communicating the first communication stream.

3. A method according to claim 2, further comprising:
forwarding the Scout Error message towards the source node and the destination node of the selected lowest priority stream.

4. In a multi-hop time division multiple access (TDMA) network comprising a source node seeking to transmit a first communication stream having one or more quality of service (QoS) requirements to a destination node, a method for allowing an intermediate node to preempt a lower priority communication stream for use by the source node, the method comprising:
transmitting, from the source node, a scout request message to initiate a slot allocation procedure for the first communication stream;
receiving, at an intermediate node along a route between the source node and a destination node, the scout request message;
determining, at the intermediate node, whether one or more free time slots are available to support the first communication stream of the source node;
when the intermediate node determines that free time slots are not available to support the first communication stream of the source node and when the intermediate node is not supporting a communication stream through the intermediate node:
identifying a lowest priority stream supported at a neighbor node by evaluating a Neighbor Table containing one or more supported stream identifiers (IDs) and their respective stream priority values supported streams and their priorities, wherein the lowest priority stream has a lower priority than the first communication stream; and transmitting a PREEMPT message to the neighbor node to free one or more TDMA slots being used for the lowest priority stream for use in communicating the first communication stream;

when the intermediate node determines that the free time slots are not available to support the first communication stream and when the intermediate node is supporting a communication stream through the intermediate node:

identifying a lowest priority stream supported at the intermediate node by evaluating a Slot Allocation Table (SAT) of the intermediate node, wherein the lowest priority stream has a lower priority than the first communication stream, and transmitting one or more Scout Error messages including a stream identification (ID) which uniquely identifies the communication stream to free one or more nodes along a path of the identified lowest priority stream to free one or more TDMA slots used by the lowest priority stream for use in communicating the first communication stream.

5. A method according to claim 4, wherein the step of freeing time slots being used by the intermediate node for use by the intermediate node, comprises:

determining, at the intermediate node based on a neighbor table of the intermediate node, a selected neighbor node that supports the lowest priority communication stream for preemption;

transmitting, from the intermediate node, a PREEMPT message to the selected neighbor node so that the selected neighbor node stops supporting the low priority communication stream, and releases the time slots being used for the low priority communication stream;

transmitting, when the selected neighbor node receives the PREEMPT message, a Scout Error message from the selected neighbor node towards a source and a destination node of the lowest priority communication stream, wherein the Scout Error message comprises a stream ID which uniquely identifies the communication stream; and freeing the time slots being used by the intermediate nodes which receive the Scout Error message identifying the selected lowest priority communication stream.

6. A method according to claim 5, further comprising:

forwarding the Scout Error message towards the source node and the destination node of the selected lowest priority stream.

7. A method according to claim 4, wherein when the intermediate node determines that it is currently supporting one or more communication streams being transmitted through the intermediate node to other nodes, further comprising:

freeing time slots being used by the intermediate node for use by the source node.

8. In a multi-hop time division multiple access (TDMA) network comprising a source node seeking to transmit a first communication stream to a destination node, a method for allowing the source node to preempt a lower priority communication stream, the method comprising:

supporting user priorities during slot scheduling in the multi-hop TDMA network based on stream-identifiers (IDs) and stream priority values exchanged by each of the nodes in the multi-hop TDMA network;

transmitting, a scout request message to a next-hop node along a route towards the destination node, wherein the scout request message comprises a stream ID and a user priority value of the node that initiated time slot scheduling procedure;

determining, if free time slots are available along the route between the source node and the destination node to meet QoS requirements of the first communication stream;

when free time slots are not available at a node along the route towards the destination node, determining, based on the stream priorities in a Slot Allocation Table (SAT) when the node is serving as an intermediate node for a communication stream and determining based on a neighbor table containing one or more supported stream identifiers (IDs) and their respective stream priority values when the node is not serving as an intermediate node for a communication stream, whether there is a lower priority communication stream in the neighborhood which is using one or more time slots;

when there is a lower priority communication stream, freeing the one or more time slots currently being used by the lower priority communication stream;

and allocating the one or more time slots for the first communication stream originated by the source node.

9. A method according to claim 8, wherein the step of supporting user priorities at each node in the multi-hop TDMA network based on stream-identifiers (IDs) and stream priority values exchanged by each of the nodes in the multi-hop TDMA network, comprises:

transmitting, from each node in the multi-hop TDMA network, a HELLO message on a regular basis, wherein each HELLO message comprises a stream priority map (SPM), wherein each SPM comprises:

one or more stream-identifiers (IDs) which identify each particular communication stream supported by the particular node, and corresponding stream-priority values associated with each stream-identifier of each of the communication streams transmitting Scout Request message to initiate slot allocation procedure that carries user priority value of originator of communication stream which is stored at each node as stream priority value.

10. A method according to claim 9, further comprising:

maintaining, at each node in the multi-hop TDMA network, a neighbor table comprising information received in HELLO messages from each neighbor node including a stream priority map provided in each HELLO message, and maintaining, at each node, a Slot Allocation Table which stores information about each supported communication stream including a stream ID and a stream priority.

11. A method according to claim 8, wherein the step of determining, based on the stream priorities in the SAT or the neighbor table, whether there is a lower priority communication stream in the neighborhood, which is using one or more time slots, comprises:

checking, when the node is supporting one or more communication stream through the node, the SAT to find a stream with a lower priority than the user priority of the originator of a current high priority communication stream identified in Scout Request message; and checking, when the node is not supporting any communication stream through the node, the neighbor table and selecting a neighbor node that supports a lower priority stream in comparison to the user priority of the originator of the current high priority communication stream identified in Scout Request message.

12. A method according to claim 8, wherein the step of freeing the particular time slots currently being used by the lower priority communication stream, comprises:

determining, at the node along the route towards destination is not supporting any communication stream through the node and selecting a neighbor node that supports lowest priority stream; and transmitting, a PREEMPT message to the selected neighbor node supporting the lowest priority communication stream, when the node determines that the node is not supporting any communication stream through the node.

13. A method according to claim 12, further comprising:

releasing the time slots being used for the lowest priority communication stream when the neighbor node receives PREEMPT message;

transmitting, when the selected neighbor node receives the PREEMPT message, a Scout Error message from the selected neighbor node towards the source destination node of the lowest communication stream, wherein the Scout Error message comprises a stream ID which uniquely identifies the communication stream; and freeing the time slots being used to support the lowest communication stream at the nodes which receive the Scout Error message which identifies the lowest communication stream through stream ID.

14. A method according to claim 13, further comprising:

forwarding the Scout Error message towards the source node and the destination node of the selected lowest priority stream.

15. A method according to claim 7, wherein the step of freeing the particular time slots currently being used by the lower priority communication stream, comprises:

determining whether the node along the route towards destination is supporting one or more communication stream;

selecting lowest priority communication stream;

transmitting, a Scout Error message towards the source and destination node of the selected lowest priority communication stream, wherein the Scout Error message frees the time slots being used to support the lowest priority communication stream; and freeing the time slots being used to support the lowest communication stream at the nodes which receive the Scout Error message which identifies the lowest communication stream through stream ID.

16. A method according to claim 15, further comprising:

forwarding the Scout Error message towards the source node and the destination node of the selected lowest priority stream.

\* \* \* \* \*

UNITED STATES PATENT AND TRADEMARK OFFICE
CERTIFICATE OF CORRECTION

PATENT NO. : 8,300,618 B2  
APPLICATION NO. : 11/781015  
DATED : October 30, 2012  
INVENTOR(S) : Joshi et al.

Page 1 of 1

It is certified that error appears in the above-identified patent and that said Letters Patent is hereby corrected as shown below:

On the Cover Page, item (56), under "OTHER PUBLICATIONS", in Column 2, Line 5, delete "Network." and insert -- Network, --, therefor.

In Column 5, Line 11, delete "an node, such as an" and insert -- a node, such as a --, therefor.

In Column 7, Line 29, delete "a Hello" and insert -- Hello --, therefor.

In Column 11, Line 23, delete "Slots" and insert -- Slot Map --, therefor.

In Column 12, Line 8, delete "Selffx" and insert -- SelfTx --, therefor.

In Column 19, Line 48, in Claim 1, delete "Time" and insert -- time --, therefor.

In Column 20, Line 31, in Claim 2, delete "stream ,identified" and insert -- stream, identified --, therefor.

In Column 22, Line 35, in Claim 9, delete "streams" and insert -- streams, and --, therefor.

Signed and Sealed this  
Twelfth Day of February, 2013

Teresa Stanek Rea  
*Acting Director of the United States Patent and Trademark Office*